United States Patent Office 3,574,559
Patented Apr. 13, 1971

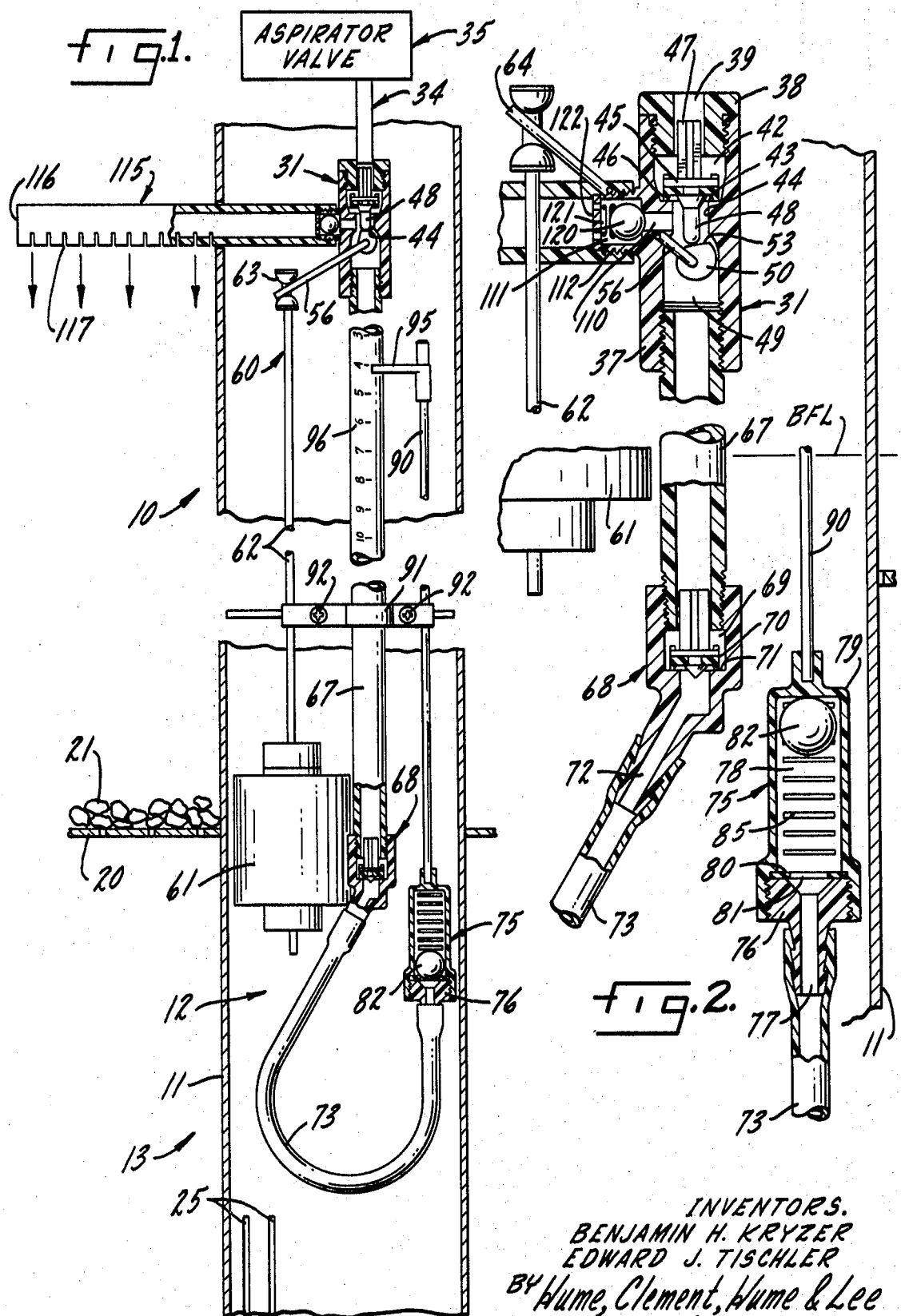

3,574,559
BRINE SYSTEM
Benjamin H. Kryzer and Edward J. Tischler, St. Paul,
Minn., assignors to Ecodyne Corporation, Chicago, Ill.
Filed July 3, 1968, Ser. No. 742,348
Int. Cl. B01f 1/00; C01d 3/04
U.S. Cl. 23—272                                    3 Claims

ABSTRACT OF THE DISCLOSURE

A brine valve and spray system, including a control valve arrangement which precisely measures a pre-selected amount of brine draw and brine tank refill. A spray head associated with the valve arrangement distributes refill water evenly over a salt bed to assure efficient brine formation.

BACKGROUND OF THE INVENTION

This invention relates in general to a water conditioning system. It deals more particularly with the regeneration of ion exchange material.

Water softening with ion exchange material such as resin particles or the like is well-known in the art. During the softening process or service cycle, the ion exchange resin particles acquire hardness-inducing ions from the water in exchange for "soft ions," or ions which do not induce hardness. After prolonged contact of the resin particles with the raw water, their ion exchange capacity is diminished considerably and regeneration of the ion particles must be accomplished. Regeneration is conventionally accomplished by contacting the resin particles with the brine solution, viz an aqueous solution of sodium chloride or potassium chloride or the like.

The ion exchange process and the regeneration of ion exchange material are conventionally accomplished in a resin tank, while a separate brine tank is employed to manufacture and store brine between regeneration cycles. When regeneration is initiated in the water condition system by a suitable timing means-control valve arrangement, brine is drawn from the brine tank and passed through the bed of ion exchange material in the resin tank to revitalize the bed by removing hardness-inducing ions from it and replacing them with sodium ions from the brine solution.

Actually, as is well-known, the regeneration of an ion exchange resin bed in a water conditioning system normally comprises several treatment cycles in addition to brining. These might include fresh water backwash of the ion exchange bed and, in addition, rinsing of the bed with fresh water to remove residual brine and other foreign material. It is normally during a rinsing cycle, subsequent brining, that the brine tank water supply is replenished to create more brine for the next regeneration period. After a predetermined amount of fresh water has been introduced to the brine tank, brine tank refill is terminated and the brine system is at rest pending a signal from the timing device-control valve for another regeneration.

SUMMARY OF THE INVENTION

The present invention is embodied in a brine system which manufactures brine, maintains and controls its supply level, and dispenses it to the resin tank during regeneration; more effectively, more simply, and less expensively than systems presently in use. As such, it is an object of the invention to provide a method and apparatus for assuring more consistently uniform brine production by spraying refill water onto a bed of salt retained on a salt platform in a brine system. Water spraying over the salt picks up brine as it passes through the salt to the bottom of the brine tank, thus eliminating any "bridging" in the salt bed, as is normally encountered in conventional brine systems, and assuring efficient brine manufacture. It is another object to provide an improved brine valve arrangement for automatically controlling fresh water refill and brine draw in the brine system.

It is still another object to provide an improved brine draw regulator arrangement for controlling the amount of brine drawn during each regeneration cycle.

The foregoing and other objects are realized in accord with the present invention by providing a brine valve arrangement, including a cam operated inlet valve wherein the inlet cam is controlled by float responsive to brine level within the tank. After brine draw during the regeneration cycle, when the brine level in the brine tank is at its low point, the float causes the cam to open the inlet valve during the rinse cycle, for example, in the normal water conditioning system. Water enters the brine tank through the inlet valve, by-passes a one-way check valve and is sprayed over a salt bed retained on a conventional salt platform in the tank through a spray head. Brine is thus manufactured in the tank.

As the brine level rises, the float moves upwardly, and at a preselected brine level it moves the cam to cause closing of the inlet valve, forestalling further introduction of fresh water to the brine tank through the spray head. Until the water conditioning system again calls for regeneration according to a predetermined schedule, the brine system remains inactive with the inlet valve in its closed position.

When regeneration is signalled, the suction created by the aspirator normally positioned in the aforementioned control valve causes the inlet valve to open. This same suction causes the aforementioned one-way check valve to effectively close communication with the spray head. The suction, in turn, opens a second one-way check valve opposite the inlet valve from the first one-way check valve, permitting brine to be drawn through a flexible tube from a brine draw head.

Brine continues to be drawn in this manner through the brine draw head until a floating ball in the head descends to a predetermined level, closing off the brine draw head and preventing air being drawn into the water conditioning system. The level of the brine head in the brine tank is preset, according to the invention, so that the brine flow ends at a preselected level determinative of the amount of brine to be drawn for the regeneration cycle.

BRIEF DESCRIPTION OF THE DRAWING

The invention, both as to its construction and method of operation, taken with further objects and advantages thereof, is best understood by reference to the following description, taken in conjunction with the accompanying drawing, in which:

FIG. 1 is a front sectional view of a portion of a brine tank including a brine system embodying features of the present invention, with certain parts broken away and others shown diagrammatically, the brine system being in a "filling" setting; and FIG. 2 is an enlarged front sectional view of a portion of the brine system illustrated in FIG. 1, with the system in a "shut-off" setting.

DESCRIPTION OF THE PREFERRED EMBODIMENT

Referring now to the drawing, and particularly to FIG. 1, a brine valve and spray system embodying features of the present invention is illustrated generally at 10. The brine valve and spray system 10 is mounted within a conventional brine drum (not shown). It includes an upright cylinder 11 which separates a valve compartment 12 within the cylinder from a brine compartment 13 without the cylinder.

The cylinder 11 extends through and is supported by a foraminous, horizontal, salt-supporting platform 20 inside the drum. The platform 20 extends across the brine compartment 13 at a level spaced above the bottom of the drum and on it is maintained a layer 21 of salt from which brine is formed according to the invention. The brine valve compartment 12 is in communication with the brine compartment 13 through a series of vertically disposed slots 25 in the base of the cylinder.

The brine valve and spray system 10 includes an assembly body 31 rigidly connected to and depending from conventional fluid conduit fitting means (not shown) at the top of the brine drum in the cylinder 11. The fitting means is, in turn, connected in a conventional manner by fluid conduits, illustrated diagrammatically at 34, to an aspirator valve, illustrated diagrammatically at 35. The aspirator valve 35, at the command of the aforementioned timing means-control valve arrangement, is effective to draw brine from the brine drum, under control of the assembly 10, for introduction to a treatment tank during the brining cycle of regeneration.

As best seen in FIG. 2, the body 31 includes a generally cylindrical sleeve 37 having a cap 38 threaded into its upper end. The cap 38 is adapted to receive the conduit means 34 in an axially arranged aperture 39.

Immediately below the cap 38, within the sleeve 37, is formed a chamber 42. A valve seat 43 surrounding a reduced diameter throat 44 in the sleeve 37 defines the lower end of the chamber 42. A valve member 45 having an annular, resilient sealing lip 46 is vertically movable in the chamber 42, guided by its stem 47, which extends upwardly into the aperture 39 in the cap 38.

The valve member 45 additionally includes a cam pin 48 depending from it and extending through the throat 44 into a lower valve chamber 49 in the body 31. The pin 48 is adapted to engage and travel on a cam member 50 rotatably mounted in the chamber 49 of the body sleeve 37.

The cam member 50 has an eccentric cam surface 53 formed on its periphery and adapted to force the valve member 45 upwardly off its valve seat 43 when in the position seen in FIG. 1, while permitting the member 45 to seal against the seat 43 when in the position seen in FIG. 2. The position of the cam member 50 is controlled by an arm 56 suitably fixed to one end of the mounting pin (not shown) for the cam member outside of the sleeve 37.

The arm 56 and, accordingly, the position of the cam member 50 is, in turn, controlled or set by a float unit 60, all according to the invention. The float unit 60 includes a buoyant float member 61 vertically adjustable on a float rod 62. The upper end of the rod 62 mounts a loose motion connector 63 which operatively receives the forked end 64 of the control arm 56. Vertical movement of the rod 62 pivots the arm through an arc of approximately 60°.

The body sleeve 37 has a rigid plastic tube 67 threaded into its lower end. The tube 67 depends to a point adjacent the salt platform 20 and a check valve fitting 68 is threaded onto the lower end of the tube. Mounted within a chamber 69 in the fitting 68 is a conventional check valve 70, adapted to seat on a valve seat 71 surrounding the access passage 72 through the lower end of the fitting.

The lower end of the fitting 68 is provided with friction ridges and has one end of a flexible plastic tube 73 suitably slipped thereover in a conventional friction fit. The tube 73 depends and rises in a half-loop to where it is connected with another check valve fitting 75. The tube 73 is slipped in another conventional friction fit over the base cap 76 of the fitting 75.

The base cap 76 has a vertically extending passage 77 therethrough communicating with a chamber 78 in the fitting body 79 threaded onto the base 76. A washer 80 disposed between the base 76 and the body 79 defines a valve seat 81 in the chamber 78 for a floatable ball valve 82. A plurality of horizontally disposed slots 85 in the body 79 place the chamber 78 in communication with the compartment 12 inside the cylinder.

As will hereinafter be discussed in relation to the operation of the assembly 10, the brine fill level may be set, according to the invention, by adjusting the vertical position of the fitting 75 with a vertically extending, flexible control member 90. The control member 90, as well as the aforementioned control rod 62, are slidably mounted in a suitably constructed guide fitting 91 secured to the depending rigid tube 67 by conventional screw fasteners 92.

A pointer 95 is mounted on the control member 90 so that it extends into adjacent relationship with a vertically spaced series of brine draw indicator indicia 96 inscribed on the rigid plastic tube 67. The indicia 96 are inscribed on the tube 67 according to a preliminarily established test of brine draw volume. In FIG. 1, for example, it will be seen that the system is set for a 4-gallon brine draw. The amount of brine draw may also be adjusted by adjusting the brine fill level BFL (see FIG. 2), which is a function of the float unit 60, as will hereinafter be explained in detail.

The control member 90 is set at a predetermined level by suitable manual manipulation from outside of the brine drum in any well-known manner. In fact, the indicating indicia 96 might also be disposed outside the drum. It is only important that the float valve fitting 75 be established at a preselected level within the brine drum.

Turning now to operation of system, assume that the water conditioning system is in its normal service cycle, shortly before regeneration. The brine level in the drum is at the preselected brine fill level BFL. The float member 61, floating on the brine, has forced its extending control rod 62 upwardly, forcing the cam arm 56 upwardly.

With the cam arm 56 in its upwardly inclined position, as illustrated in FIG. 2, the cam surface 53 is positioned to permit the cam pin 48 depending from the valve 45 to move downwardly in sealing relationship against the valve seat 43. The valve 45 thus shuts off communication with the system 10.

When the timer-control valve signals for regeneration-brining of the ion exchange resin bed in the system treatment tank, the aspirator 35 is effective to create a suction in the conduit 34. The suction in the conduit 34 draws the valve 45 off the valve seat 43, opening communication through the throat 44 into the lower chamber 49 of the valve body. This suction is also effective to lift the check valve 70 in the fitting 68 off its valve seat 71.

With the brine in the brine tank at its brine filled level BFL, the floatable ball valve 82 is in its upper position, against the roof of the body 79, as illustrated in FIG. 2. Accordingly, the suction developed by the aspirator valve is effective past the check valves 45 and 70, through the tube 73, into the chamber 78 within the fitting body 79. Brine is drawn from the chamber through the fitting 75, the tube 73, the fitting 68, the rigid tube 67, the body 31, and the conduit 34 to the control valve for routing to the treatment tank.

Brine continues to be drawn from the compartments 12 and 13 in the aforedescribed manner while suction is effective; that is, until it descends below the valve seat 81 in the fitting 75. At this point, no more brine can be drawn from the chamber. It will thus be seen that the level of the fitting 75, or, more precisely, the level of the valve seat 81 in the brine chamber 78 is determinative of the amount of brine which is drawn from the system, assuming a predetermined brine fill level BFL. The ball 82 seats against the valve seat 81 at this point to prevent air being drawn through the system.

After the brining cycle, it is characteristic of this type of system that a slow rinse cycle follow. During this slow rinse cycle, the aspirator valve continues to develop suction past the check valves 45 and 70 but no brine is drawn, nor is air drawn into the system past the ball valve 82. When the aforementioned timing device signals the end of slow rinse, the aspirator valve cuts off suction to the assembly 10, and, normally, a brine tank refill function begins during the next cycle of regeneration or normal service softening in the service system.

Refill water flows from the control valve through the conduits 34 and past the check valve 45 into the throat 44 of the sleeve 37 in the body member 31. The check valve 45 was raised off its valve seat 43 by the cam 50 which rotated to the position illustrated in FIG. 1 as the float 61 descended during the aforedescribed brine draw.

Extending transversely from the throat 44 in the sleeve 37 is a brine refill passage 110. The brine refill passage 110 opens into a cup-shaped valve well 111 formed in an externally threaded fitting 112 extending transversely from the side of the sleeve 37. Threaded onto the fitting 112 is a transversely extending refill spray head 115 embodying features of the invention.

The refill spray head 115 is, in the embodiment illustrated an elongated pipe which extends through a suitably formed aperture in the cylinder 11 and is closed at its outer end 116. A plurality of spray slots 117 are provided in spaced relationship along the lower side of the pipe between the cylinder and the end 116.

Refill water entering the sleeve 37 of the fitting body 31 cannot pass into the valve compartment 12 or brine compartment 13 because the check valve 70 seats tightly on its valve seat 71 in the fitting 68 under these circumstances. This refill water pushes a ball valve 120 in the fitting 112 away from a valve seat defined around the passage 110 against the bias of a coil spring 121 retained in the well 111 against the ball 120 by a washer 122. Refill water flows past the ball valve 120 into the head 115.

This refill water sprays over the bed 21 of salt disposed on the salt platform 20. The spray is relatively uniform over the surface of the bed 21 of salt, so that passage of the water through the salt is not concentrated in one area. This eliminates any "bridging" which might occur if a concentrated stream of water were to be directed onto the bed 21, preventing water contacting the salt and making brine build-up ineffective.

The spray head 115 has been described as an elongated pipe. It might, however, take other forms. It is only important that a relatively fine spray is thrown over the entire salt bed 21 in its dissemination.

The brine level rises in the brine drum, causing the float 61 to move upwardly. When the brine reaches the brine fill level BFL, the cam arm 56 has been rotated sufficiently to permit the valve 45 to snap downwardly against the valve seat 43, shutting off the inrush of refill water. The system is once more ready for the next regeneration brine draw cycle.

The brine fill level BFL can be varied to provide another means of controlling brine drawn according to the invention. To this end, the float member 61 is vertically adjustable on the control rod 62. This permits pre-setting the valve 45 shut-off for any selected BFL.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A brine generator for use in a brine system for water conditioning, including a brine tank comprising:
    (a) a horizontal, foraminous salt tray disposed in said tank and adapted to carry a bed of salt,
    (b) cylinder means extending through said tray and defining, within said tank, a valve compartment within said cylinder means and a brine compartment outside said cylinder means below said tray,
    (c) perforations in said cylinder means below the level of said tray connecting said compartments in liquid communication,
    (d) conduit means extending into said valve compartment for alternately introducing water and removing brine,
    (e) means connected to one end of said conduit means for alternately introducing water into and drawing a vacuum on said conduit according to a timed cycle,
    (f) valve means in said cylinder means connected to the other end of said conduit means for controlling the influx of refill water to said tank and the efflux of brine from said tank,
    (g) said valve means including a main valve unit having a check valve therein adapted to normally prevent the influx of refill water to said tank,
    (h) cam means associated with said main valve unit for rendering said check valve ineffective to prevent the influx of refill water to said tank,
    (i) a spray head communicating with said main valve unit and extending through said cylinder into said brine tank above said tray at a height above the level of the bed of salt disposed thereon, said spray head being effective to spray the refill water substantially uniformly over the bed of salt on said tray,
    (j) check valve means disposed between said main valve unit and said spray head for permitting flow of fluid only from said main valve unit to said spray head,
    (k) a brine tube disposed in said cylinder and connected at one end to said valve unit,
    (l) check valve means disposed between said main valve unit and said brine tube for permitting flow of liquid only from said brine tube to said valve unit,
    (m) float valve means associated with said other end of said brine tube for sealing said other end when the brine level descends to said mininum level, and
    (n) float means disposed in said cylinder operatively connected to said cam means for manipulating said cam means to control said check valve such that said cam renders said check valve ineffective when the liquid level in said tank falls below a predetermined level and renders said check valve effective when the liquid level raises to a level above said predetermined level.

2. The invention of claim 1 further characterized by and including:
    (a) said brine tube being of a flexible material, and
    (b) control means for adjusting the level of said other end of said brine tube for presetting the minimum brine level and, accordingly, the brine draw from said system.

3. The invention of claim 2 wherein said control means has indicator means whereby the amount of brine draw can be visually preset.

References Cited
UNITED STATES PATENTS

| | | | |
|---|---|---|---|
| 2,071,997 | 2/1937 | Bard | 210—126X |
| 2,614,032 | 10/1952 | Eichstaedt | 23—272 |
| 2,724,404 | 11/1955 | Kass | 137—446 |
| 2,756,769 | 7/1956 | Martin | 137—446X |
| 2,906,285 | 9/1959 | Rosten | 210—126 |
| 2,922,433 | 1/1960 | Techler | 23—312X |
| 3,089,508 | 5/1963 | Schulze | 23—267.5X |
| 3,190,726 | 6/1965 | Rudelick | 23—267.5 |
| 3,202,174 | 8/1965 | Rudelick | 23—272X |
| 3,292,789 | 12/1966 | O'Connor | 210—126X |
| 3,509,998 | 5/1970 | Pellett | 137—446 |

NORMAN YUDKOFF, Primary Examiner

S. J. EMERY, Assistant Examiner

U.S. Cl. X.R.

23—272.7, 311, 312; 210—126, 191; 137—446